United States Patent
Parkinson

(10) Patent No.: US 7,418,378 B2
(45) Date of Patent: Aug. 26, 2008

(54) METHOD AND APPARATUS FOR TRAINING AND DEPLOYMENT OF A STATISTICAL MODEL OF SYNTACTIC ATTACHMENT LIKELIHOOD

(75) Inventor: David J. Parkinson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 794 days.

(21) Appl. No.: 10/744,312

(22) Filed: Dec. 22, 2003

(65) Prior Publication Data

US 2005/0137849 A1 Jun. 23, 2005

(51) Int. Cl.
  *G06F 17/27* (2006.01)
(52) U.S. Cl. .............. 704/9; 704/2; 704/277; 704/257
(58) Field of Classification Search ............. 704/1–10, 704/257, 277
  See application file for complete search history.

(56) References Cited

U.S. PATENT DOCUMENTS 5,477,450 A * 12/1995 Takeda et al. ............. 704/2
7,085,708 B2 * 8/2006 Manson ..................... 704/9

* cited by examiner

*Primary Examiner*—Huyen X. Vo
(74) *Attorney, Agent, or Firm*—Joseph R. Kelly; Westman, Champlin & Kelly, P.A.

(57) ABSTRACT

The present invention discloses a method and apparatus for improving the performance of a natural language parser. During training, natural language inputs are processed such that statistical information is extracted, concerning the frequency of attachment of certain phrase types of interest to certain other host phrase types. In one embodiment, only unambiguous attachments are examined during training. During runtime this statistical information is used in cases where the attachment of some phrase type of interest is ambiguous. In such cases, the statistical model is used to evaluate the relative likelihood of the alternative attachments resulting in a good interpretation. A syntactic representation can be produced for each alternative attachment that the statistical model deems likely to result in a good interpretation.

8 Claims, 9 Drawing Sheets

METHOD AND APPARATUS FOR TRAINING AND DEPLOYMENT OF A STATISTICAL MODEL OF SYNTACTIC ATTACHMENT LIKELIHOOD

BACKGROUND OF THE INVENTION

The present invention relates to natural language processing. In particular, the present invention relates to syntactic parsing of text.

A natural language parser is a program that takes a text segment, usually a sentence, of natural language (i.e., human language, such as English) and produces a representation of the syntactic structures in the sentence. One common representation is a parse tree that represents the syntactic structure in a hierarchical manner with leaf nodes that represent the individual words of the text segment and a root node that spans the entire text segment.

In general, natural language parsers build the parse trees by applying syntax rules to the input text segment. Parsers apply these rules in either a "top-down" or a "bottom-up" manner.

In a bottom-up parser, all of the possible parts of speech for the individual words of the input text are first identified to form a set of word tokens. The parser then attempts to combine the individual word tokens into larger syntactic structures, such as noun phrases and verb phrases, by applying syntax rules to the tokens. The resulting larger structures represent candidate nodes for the parse tree. The parser continues to try to build larger and larger structures by applying syntactic rules to previously identified candidate nodes. A full parse is achieved when a node spans the entire text segment.

During the construction of the nodes, attribute-value pairs that describe the structure represented by the node are created. For example, a first token attribute and a last token attribute are associated with each node to indicate the position in the input string of the first token that the node spans and the position in the input string of the last token that the node spans. Additionally, each node has a "head" attribute that designates the primary element of the phrase represented by that node, a "prmods" attribute that designates the (potentially empty) list of modifiers found before the head in the phrase, and a "psmods" attribute that designates the (potentially empty) list of modifiers found after the head in the phrase. The number and type of attributes that are associated with a node is unlimited and is controlled by the rule used to form the node.

The computational complexity of forming the parse is a function of the number of candidate nodes that are formed. To limit the number of candidate nodes, some systems adopt a minimal attachment strategy that prevents certain candidate nodes from being formed if other candidate nodes have already been formed or are expected to be formed.

Although this minimal attachment strategy reduces the complexity of forming an initial parse structure, it can result in parse trees that are less than optimal. To address this, many parsing systems re-examine the initial parse trees to determine if each tree can be changed to provide a better parse.

The goal of such systems is to provide a single improved parse tree for each initial parse tree. Thus, even though an initial parse tree could be modified in several different ways, parsing systems of the prior art have been limited to providing only one modified parse tree for each initial parse tree.

Such systems are not desirable because the syntactic rules used to identify an improved parse have a limited ability to resolve syntactic ambiguities in the initial parse. As a result, the best parse for the sentence may not be produced by the syntactic parser.

SUMMARY OF THE INVENTION

The present invention is directed to a method of improving the performance of a natural language parser. Various embodiments of the invention include a training mode and a deployment mode. During training, natural language inputs are processed such that statistical information is extracted, concerning the frequency of attachment of certain phrase types of interest to certain other host phrase types. In order to ensure that all extracted statistical information is as reliable as possible, only unambiguous attachments are examined during training. During deployment, this statistical information is used in cases where the attachment of some phrase type of interest is ambiguous; in other words the phrase type of interest could be attached to more than one host phrase. In such cases, the statistical model is used to evaluate the relative likelihood of the alternative attachments resulting in a good interpretation. Depending on the outcome of this statistical evaluation, a syntactic representation is produced for each alternative attachment that the statistical model deems likely to result in a good interpretation.

Training the statistical attachment likelihood model involves using the existing parser to parse a large volume of natural language data, constructing a basic syntactic representation of each input. In this basic syntactic representation, all phrase types whose attachment position is ambiguous are typically attached as low in the syntactic representation as possible. The input can be generally equivalent to a sentence, or it may not form a full grammatically complete sentence, as in the case of a noun phrase or other sentence fragment. For each input, the best syntactic representation is chosen, according to an existing statistical goodness metric designed to be successful in ranking the relative goodness of basic syntactic representations. This highest-ranked representation is then examined for all unambiguous syntactic attachments involving phrase types of interest. For each of these unambiguous attachments, a set of n-gram counts is incremented.

In the run-time (or deployment) phase of the present invention, the data file containing n-grams and associated frequencies is consulted during syntactic parsing in order to resolve cases of ambiguous attachment. These cases of ambiguous attachment arise when producing the so-called basic syntactic representation, since certain phrases are deliberately left attached as low as possible by the design of this processing layer. Therefore, to produce the best possible set of interpretations for some input, it is necessary to determine the best possible attachment positions for these phrases.

DETAILED DESCRIPTION OF ILLUSTRATIVE EMBODIMENTS

Figure 1:
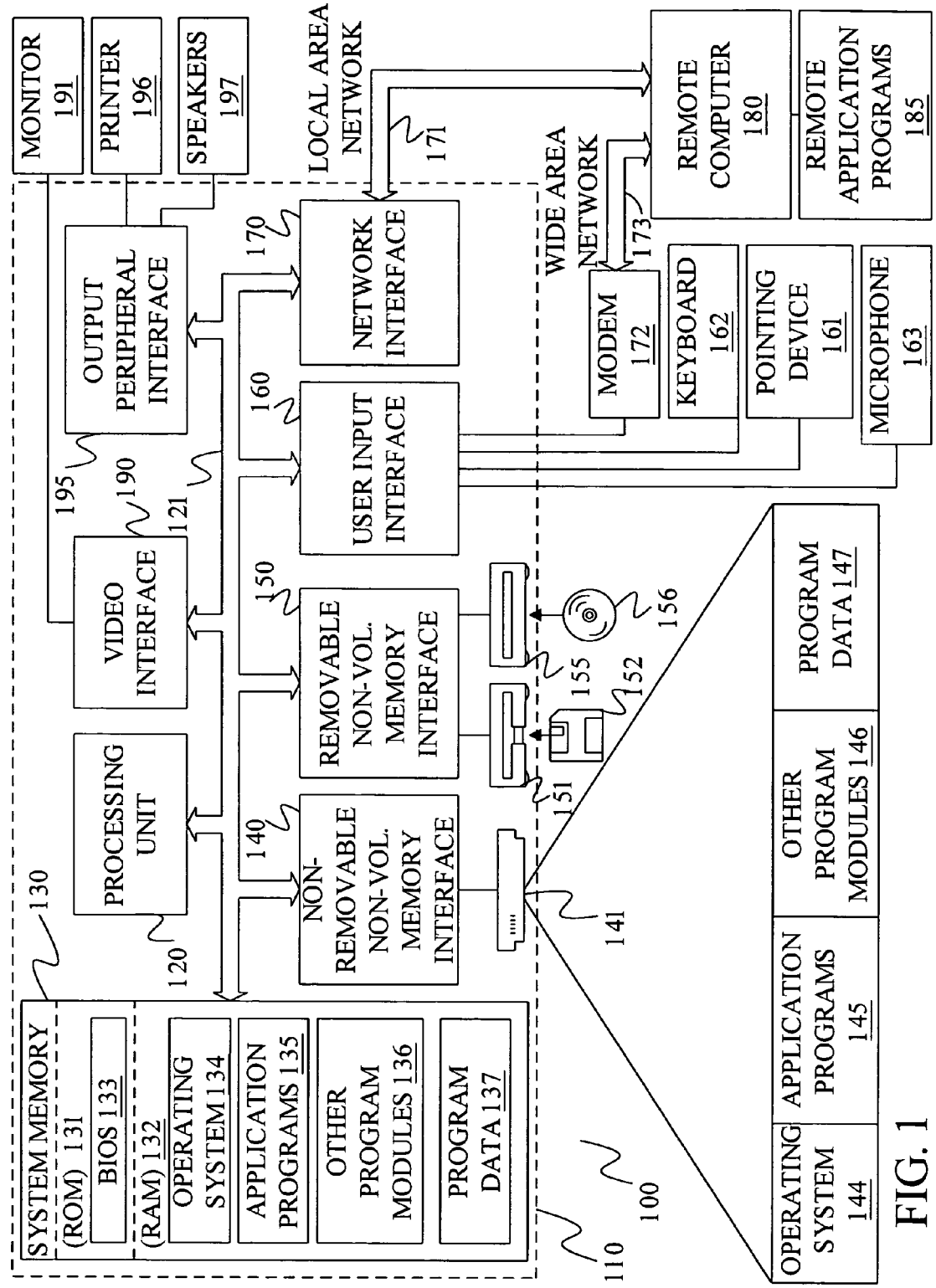
FIG. 1 is a block diagram of one exemplary environment in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
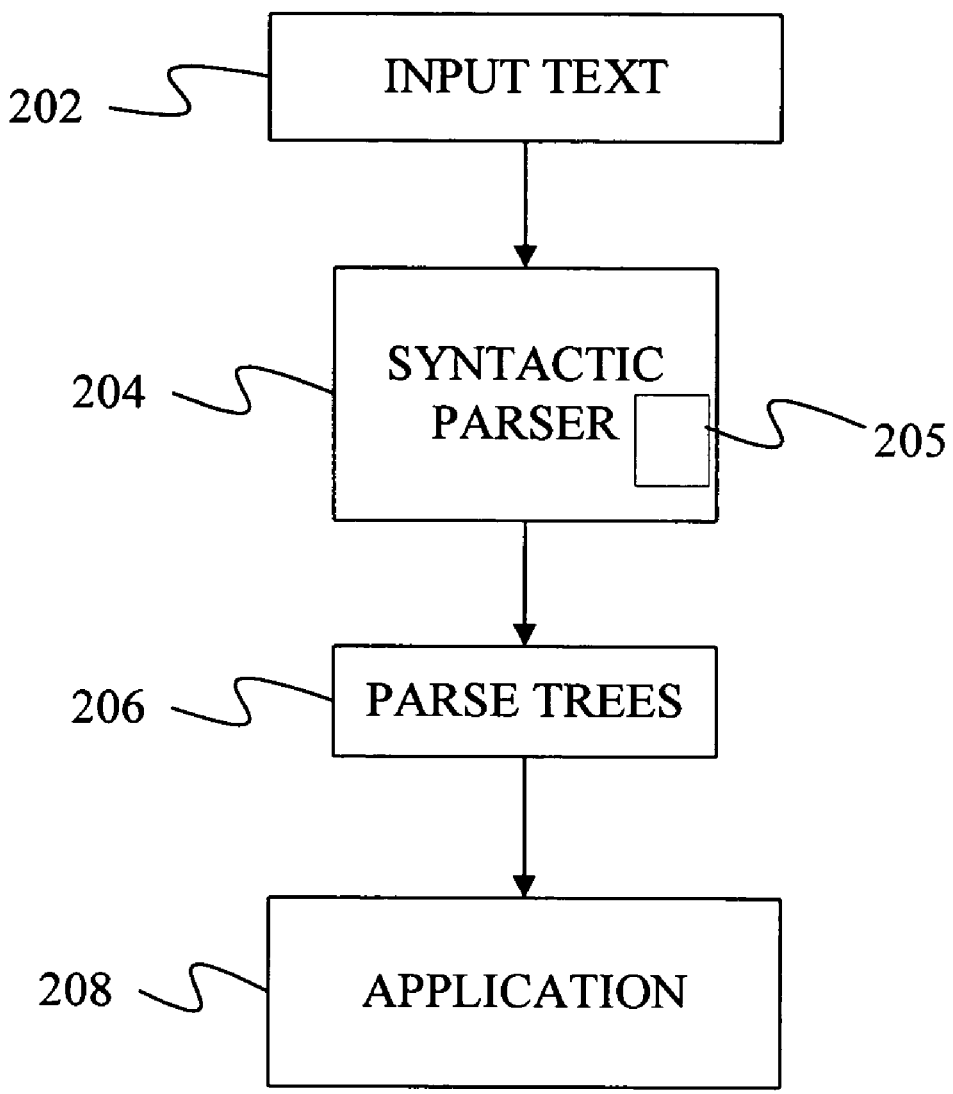
FIG. 2 is a block diagram of a natural language processing system.

FIG. 2 shows that the present invention can be employed as a natural language parser 204, which converts an input text 202 into a set of possible syntactic structures (or parse trees) 206. Unlike parsers of the prior art, natural language parser 204 is able to generate multiple possible syntactic structures 206 that represent the input text 202 based on a single syntactic parse. These syntactic structures 206 are provided to an application 208 which utilizes the syntactic structures 206 to perform a natural language function. As part of performing the natural language function, many applications 208 are able to resolve ambiguities between multiple syntactic structures 206 in order to select one structure as containing the proper syntax for the sentence. In order to provide better parse trees (or syntactic structures) 206 to the application program 208, parser 204 includes an attachment component 205. Attachment component 205 allows the parser 204 to place ambiguous attachments of the textual input 202 in the most likely syntactic location for the ambiguously attached phrase. Thus, the present invention provides a more accurate generation of the syntactic structure of a sentence by using the parser to generate multiple parse trees 206 from an initial parse when an ambiguously attached phrase is present in the input 202 and allowing an application 208 to choose the most appropriate parse tree 206 based, in one embodiment, on measures indicative of probability and other information.

Figure 3:
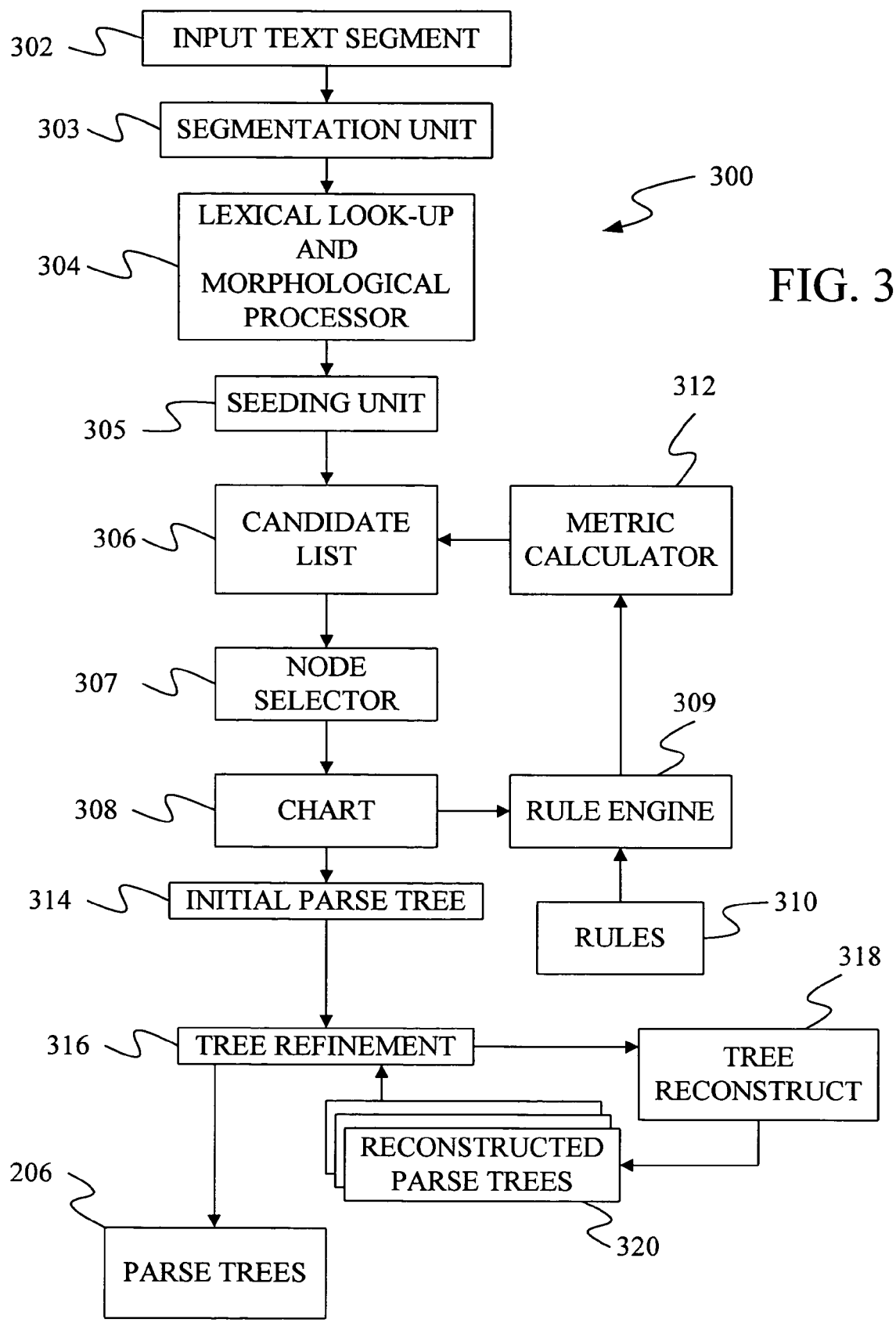
FIG. 3 is a block diagram of a syntactic parser with reattachment under one embodiment of the present invention.

FIG. 3 provides a block diagram of a natural language parser 300 according to one embodiment of the present invention. In parser 300, a segmentation unit 303 divides an input text segment 302 into individual words, which are passed to a lexicon look-up and morphological processor 304 to identify possible parts of speech for each word. Under some embodiments, the morphological processor 304 normalizes the morphological form of the words, if needed, before the words are applied against the lexicon to find the parts of speech. Each word/part-of-speech pair that is identified from the text segment forms a token that is inserted into a candidate list 306 as a starting node by a seeding unit 305.

An initial parse tree is then constructed through an iterative process. During each iteration, a single candidate node is promoted from candidate list 306 to a node chart 308 by a node selector 307. The promoted node is then tested against rules in a rule grammar 310 by a rule engine 309 to see if the promoted node can be transformed into a higher level node using one of the rules. This can occur by applying a unary rule to the promoted node by itself or by applying a rule that combines the promoted node with one or more of the nodes in node chart 308.

During testing, the phrase types of the nodes under consideration are compared to the phrase types required by a rule. For example, a rule may take a verb phrase and a noun phrase to form a larger verb phrase. For such a rule, the promoted node and at least one other node in the node chart must provide the phrase types of noun phrase and verb phrase in order for the conditions of the rule to be satisfied. If the appropriate phrase types are not present in the node chart, the next rule in rule set 310 is examined.

Note that under some embodiments, the rules have additional conditions beyond the phrase types. For example, a rule may require number agreement (singular or plural) between a noun phrase and a verb phrase. In addition, the rule may require a particular phrase level for one or more of the constituent nodes.

When the node chart contains nodes that satisfy a rule, the rule is executed to form a new node. This execution includes determining the values for a set of attributes that describe the structure of the node as well as the values for attributes that define relationships found in the phrase represented by the node. For example, the subject, object, indirect object, and lemma form of a head verb in a clause may be determined as well as the first token and last token spanned by the node.

The new node formed by executing the rule may then be scored using a metric calculator 312. The score, if any, assigned to a node, is then used to determine which node to promote next to the chart. Any of a large number of different metrics may be used to score the node. For example, the frequency of the node type, the parts of speech of the tokens to the immediate left and right of the node, the headword associated with the node, the phrase level of the node and the syntactic history of the node may all be used.

The scored node is inserted into candidate list 306. Under some embodiments, candidate list 306 is sorted based on the score of each node, so that the node with the highest score is at the top of the candidate list. At the beginning of the next iteration, this top-most candidate node is promoted to the node chart.

The iterations described above continue until one or more nodes are formed in node chart 308 that span the entire input segment. At least one of these final nodes is then selected as an initial parse tree 314.

A tree refinement module 316 and a tree reconstruction module 318 then perform a recursive procedure that constructs a set of alternative syntactic structures for each of the initial parse trees if an ambiguously attached phrase was found in the initial parse tree 314. One embodiment of this recursive procedure is described in greater detail below with respect to FIG. 6.

In determining the best location for an ambiguously attached phrase, the attachment module 205 refers to data generated during a training phase. Training a statistical attachment likelihood model used in the attachment module 205 involves using an existing and conventional parser to parse a large amount of natural language data and constructing a basic syntactic representation of each textual input in the natural language data. A textual input can be a complete sentence. However, the textual input need not be a fully grammatically complete sentence but may simply be a text fragment, such as a noun phrase or other sentence fragment. For each input, the best syntactic representation is chosen from the parser. In one embodiment of the present invention, the best syntactic representation may be determined according to an existing and conventional statistical measure of "goodness" that is designed to be successful in ranking the relative goodness of the syntactic representation outputs. This syntactic representation is examined by the process of the present invention during the training mode for all unambiguous syntactic attachments that involve phrase types that are determined to be of interest. In accordance with one embodiment of the present invention, each identified unambiguous attachment results in a set of n-gram counts being incremented.

Figure 4:
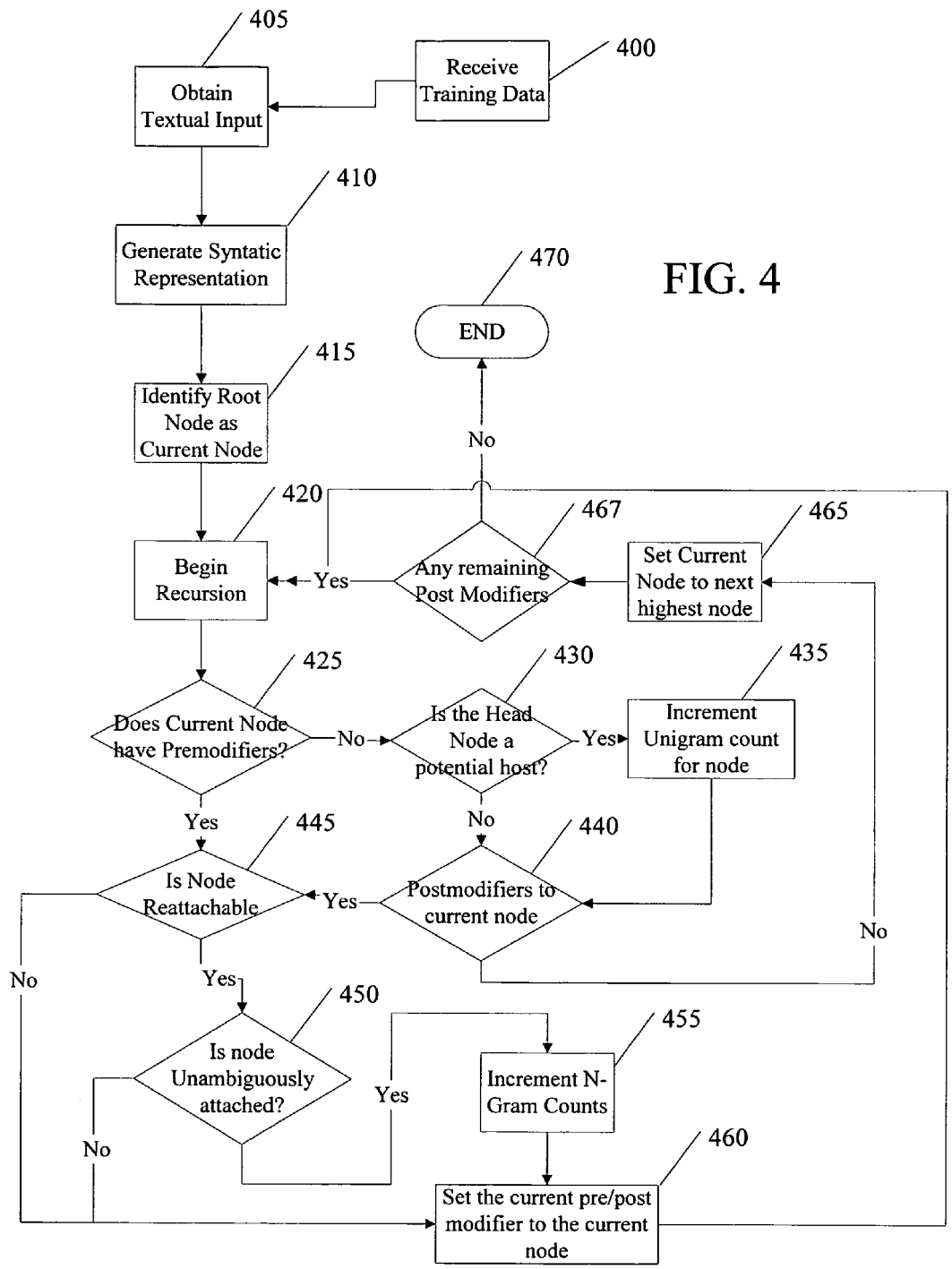
FIG. 4 is a flow diagram illustrating the steps executed during the training phase.

FIG. 4 is a flow chart illustrating the process executed by the present invention when training the attachment module 205 according to one embodiment of the present invention. At step 400 a training module component of the attachment module 205 receives a large volume of natural language training data that is provided to the module from an outside source. However, the training data can be received from other sources or can be provided as individual textual inputs. At step 405 the present invention obtains a textual input from the corpus of natural language training data. For the purposes of this discussion and example it will be assumed that the obtained textual input of step 405 is "The man from Toledo walked to the curb in his galoshes."

Figure 5:
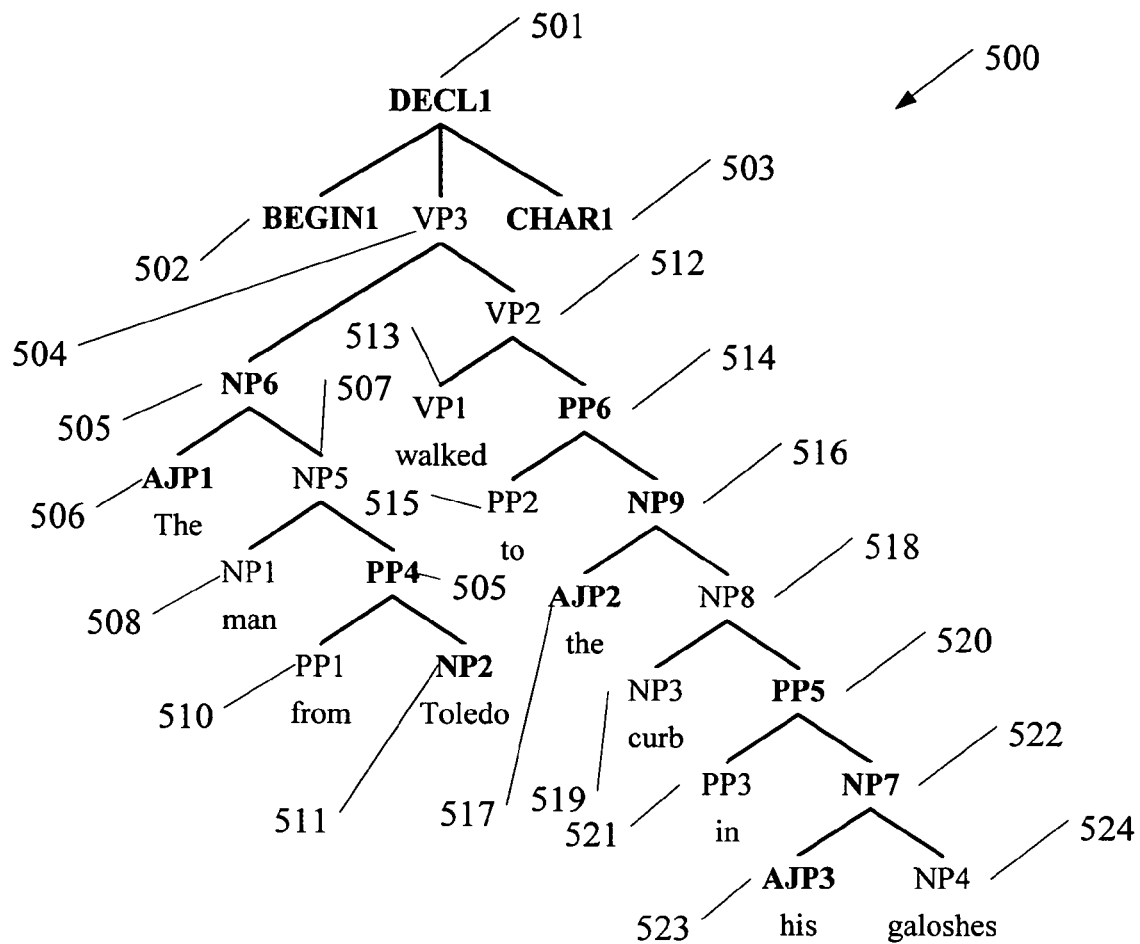
FIG. 5 is a syntactic representation of an exemplary input used in the training phase.

In step 410, the present invention generates a syntactic representation of the above textual input. In one embodiment this syntactic representation can be obtained according to the process defined in FIG. 3 above. However, other methods can be used. One illustrative example of the syntactic representation obtained for the above input is illustrated in FIG. 5. In one embodiment the syntactic parser produces the syntactic representation illustrated in FIG. 5 as the highest ranking syntactic representation for the textual input. However, this syntactic representation may also be the only syntactic representation generated for the input. The tree illustrated in FIG. 5 shows each maximal projection node by illustrating that node in bold. For example, the noun phrase illustrated NP6 505 is headed by a noun phrase NP1 illustrated by reference to element 508. In one embodiment, the process of the present invention only visits maximum projection nodes in the parse tree 500. The head of a node is the word of phrase that is the focus of the node. The "maximal projection" of a head is the topmost node in a chain of nodes that share the same head. Therefore, in one embodiment, only nodes that are the maximal projection of a head are visited by the process of the present invention.

In one embodiment of the present invention, these maximal projection nodes are analyzed in a depth-first left-to-right fashion, in a process that is called tree-walking. However, other methods can be used. At each maximal projection node the process of the present invention checks to see if the maximal projection contains any phrase identified to be of interest, which can be determined to be unambiguously adjoined. A node is considered to be unambiguously adjoined to another node if there is no other maximal projection node to which it can be adjoined. Information concerning the phrase types of interest (i.e., those which are potentially reattachable), and the types of other nodes to which they can be syntactically adjoined, is held in a lookup table, and can be freely altered for different problem domains or from one language to another.

If the node is determined to be an unambiguously adjoined node, various n-gram counts, including trigram and bigram counts, will be incremented as well as a unigram count for the head of the maximal projection node. If the phrase is determined to be ambiguously adjoined, only the unigram count will be stored. These n-gram counts are used to calculate the statistical likelihood of attachment of an identified ambiguously attached phrase during the run-time phase discussed later. For purposes of the present discussion, and for the sake of brevity, it will be assumed that for the syntactic representation illustrated in FIG. 5, the process of the present invention only searches for prepositional phrases in determining attachments, but the invention is not so limited.

The process of the present invention proceeds to identify a root node at step 415. The root node illustrated in FIG. 5 is indicated by element 501 or the wording DECL1. As the process executed is a recursive process the present invention begins recursion at step 420. The recursion through the parse tree 500 is referred to as tree-walking. As discussed above, in one embodiment of the present invention, this tree-walking is done in a depth-first left-to-right pattern.

At step 425 the process proceeds to identify and move through the premodifiers to DECL1. A premodifier is a maximal projection node which is adjoined into some other syntactic projection on the left side of the head of the projection into which it is adjoined. For example, in FIG. 5 the only premodifier of DECL1 is NP6, since NP6 is a maximal projection node and it is adjoined into DECL1 on the left side of the head of DECL1, which is VP1 "walked". The BEGIN symbol, exemplified in FIG. 5 by BEGIN1, is a special case and is not considered to be a premodifier, since it is an abstract symbol used in parsing to demarcate the left-hand edge of an input string. Next, the process determines whether the node NP6 505 is reattachable at step 445. As a noun phrase is not a potentially reattachable node type, the process recurses into the node head NP6. The recursion into the node NP6, is illustrated at step 460 where the process sets the value of the current node to NP6 505.

The system then begins a recursion into node NP6 505 at step 420. The process returns to step 425, and determines whether the current node has any premodifiers. Node NP6 505 includes a premodifier of the adjective phrase AJP1 as indicated by reference number 506. As adjective phrases are not potentially reattachable node types, the process at step 460 recurses into the node headed by AJP1 506. Returning back to step 425, the process of the present invention determines that adjective phrase AJP1 506 has no premodifiers.

As AJP1 506 has no premodifiers the process proceeds to step 430, and determines whether the head of the current node 506 is a potential host of attachment. As AJP1 506 is of a type adjective which is a potential host of attachment, the process proceeds to store an increment for the unigram count for this node at step 435. The unigram counts that are incremented are done in one embodiment of the present invention from the normalized head of AJP1 506. Unigrams that are incremented in this example are:

| | |
|---|---|
| ADJ_unigram | "DETP" |
| ADJ_unigram | "ADJ" |

It should be noted that the current description assumes that the statistical model associated with the reattachment module 205 is n-gram-based; that is to say, the events of interest for the statistical model are clusters of words and their syntactic relations to one another. However, in alternative embodiments other statistical techniques, such as maximum entropy or conditional random field modeling can be used. In the case of one of these alternative embodiments, all that would differ from the present description is the precise nature of the information stored off for each occurrence of an unambiguous syntactic attachment. However, the overall process for finding unambiguous attachments would remain the same.

At step 440 the process checks to see if the current node, in this case AJP1 506, includes any postmodifiers. As there are no postmodifiers to AJP1 506, the process moves up one level in the syntactic parse tree 500, and returns to NP6 505 at step 465.

As now all premodifiers to node NP6 505 have been analyzed the process returns to step 430. At step 430, the process determines that the head of the current node NP6 505 is of type "noun", which is a potential host of attachment. Thus the process increments the unigram counts for the normalized head of NP6 as illustrated by the following unigram increments. Unigrams that are incremented are:

| NOUN_unigram | "man" |
|---|---|
| NOUN_unigram | "NOUN" |

These unigram counts are incremented at step 435.

Following the incrementing of the unigram count of NP6 505, the process proceeds through the list of the postmodifiers to NP6 505. The only identified postmodifier to NP6 505 is identified as PP4 509. At step 440, the process then determines that a prepositional phrase is a potentially reattachable node type at step 445.

At step 450 the process determines whether PP4 509 is unambiguously attached to NP6 505. PP4 509 is unambiguously attached to NP6 505 as there is no lower attachment point within NP6 505, nor is there a higher attachment point above NP6 505, where PP4 509 can be attached. Therefore, the process increments the following n-gram counts at step 455.

| NOUN_PP_bigram | "NOUN" "PP" |
|---|---|
| NOUN_PP_bigram | "man" "PP" |
| NOUN_PP_bigram | "NOUN" "from" |
| NOUN_PP_bigram | "man" "from" |
| PP_unigram | "from" |
| NOUN_PP_NP_trigram | "man" "from" "PLACE" |
| PP_NP_bigram | "from" "PLACE" |
| NP_unigram | "PLACE" |
| NP_unigram | "NP" |

It should be noted that in the generation of the n-gram counts the word "Toledo" as indicated by noun-phrase NP2 511, in the embodiment of the present invention, is normalized to a generic "PLACE". This normalization to "PLACE" is performed because the statistical likelihood of encountering the noun phrase Toledo is lower than encountering a noun phrase indicative of just a place. Therefore, this normalization of the lexical content of the noun "Toledo" helps mitigate the problem of sparse training data. However, in alternative embodiments, this normalization need not be performed.

Following the incrementing of the n-gram counts at step 455 for PP4 509, the process of the present invention, at step 460, sets the value of the current node to PP4 509. The process then repeats the recursion with PP4 509 as the current node.

At step 425 the process determines that PP4 509 has no premodifiers. Next at step 430 it is determined that PP4 509 is of the type "preposition" which is not a potential host of attachment. Thus there is no incrementing of the unigram counts for the head of PP4 509.

The process then determines, at step 440, that PP4 509 has one postmodifier, NP2 511. At step 445 the process determines that PP4 509 is not a reattachable node and sets the current node to the postmodifier NP2 511 in step 460, and recurses through the process again starting at step 420. NP2 511 has no premodifiers. Thus the process, at step 430, determines that the head of NP2 511 is of a type "noun" which is a potential host of attachment. Therefore, at step 435 the process increments the unigram counts for the normalized head of NP2 511.

| NOUN_unigram | "PLACE" |
|---|---|
| NOUN_unigram | "NOUN" |

Once again the phrase "Toledo" is normalized to the generic "place" indicator.

Following the incrementing of the unigram counts for NP2 511 at step 440, it is determined that there are no postmodifiers to NP2 511. Thus at step 465 the process of the parser moves up one node in the parse tree 500 which is PP4 509. As there are no additional postmodifiers to PP4 509, the process recurses back up to NP6 505. As there are no additional postmodifiers to NP6 505, the process recurses back up again to DECL1 501.

Once the process of the present invention has returned to the node DECL1 501, the process proceeds to analyze the head of the current node DECL1 501. At step 430 the process determines that the current node is of a type "verb" which is a potential host for attachment. Therefore at step 435 the process increments unigram counts for the normalized head of the current node. The unigram counts incremented for this node (DECL1 501) are illustrated as follows:

| VERB_unigram | "walk" |
|---|---|
| VERB_unigram | "VERB" |

At step 440 the process determines that the current node DECL1 501 has a single postmodifier, identified as PP6 514. At step 445 the process determines that PP6 514 is a potentially reattachable node. Then at step 450 the process determines that PP6 514 is unambiguously attached to DECL1 501 as there is no lower attachment point within DECL1 501, nor is there a higher attachment point above DECL1 501, where PP6 514 could be attached. Therefore, in steps 435 and 455 the process increments the following n-gram counts for PP6 514.

| PP_unigram | "PP" |
|---|---|
| NOUN_PP_bigram | "VERB" "PP" |
| NOUN_PP_bigram | "walk" "PP" |
| NOUN_PP_bigram | "NOUN" "to" |
| NOUN_PP_bigram | "walk" "to" |
| PP_unigram | "to" |
| NOUN_PP_NP_trigram | "walk" "to" "curb" |
| PP_NP_bigram | "to" "curb" |

| | |
|---|---|
| NP_unigram | "curb" |
| NP_unigram | "NP" |

Following the incrementing of the n-gram counts, the process sets the current node to PP6 514.

The process now proceeds to analyze the current node of PP6 514. At step 425 the process determines that PP6 514 has no premodifiers. At step 430 the process determines that PP6 514 is of a type "preposition" which is not a potential host of attachment, and therefore does not increment the unigram counts for the head of PP6 514. At step 440 the process determines that PP6 514 has one postmodifier NP9 516. The process then proceeds to set the value of the current node to NP9 516 and repeats the process again. During the process of analysis of NP9 516 the process determines that the premodifier of AJP2 517 is a potential host of attachment and therefore increments the unigram count for the normalized head of AJP2 517 as follows:

| | |
|---|---|
| ADJ_unigram | "DETP" |
| ADJ_unigram | "ADJ" |

As AJP2 517 has no postmodifiers the process returns to NP9 516 at step 465, and continues with the analysis.

The head of NP9 is identified by the system at step 430 as a type of "noun" which is a potential host for attachment. Thus the algorithm at step 435 increments unigram counts for the normalized head of NP8 518 as follows:

| | |
|---|---|
| NOUN_unigram | "curb" |
| NOUN_unigram | "NOUN" |

Next the algorithm determines in step 440 that NP8 518 includes a postmodifier which is identified as PP5 520. PP5 520 is identified as a potentially reattachable node type at step 445. In step 450 the process determines that PP5 520 is ambiguously attached to NP8 518 as there is a higher attachment point above NP8 518 to which PP5 520 can be attached, namely PP5 520 could be attached to DECL1 501. As PP5 520 is ambiguously attached, the process does not increment into the n-gram counts but merely sets the value of the current node to PP5 520 at step 460.

In the analysis of node PP5 520 the process determines that PP5 520 has no premodifiers at step 425. In step 430 the process determines that the head of the current node PP5 520 is of a type "preposition" which is not a potential host of attachment, and therefore does not increment the unigram count for the head of PP5 520. The process then determines at step 440 that PP5 520 has one postmodifier NP7 522 and thus sets the value of the current node to NP7 522 at step 460.

In the analysis of node NP7 522 the process identifies in step 425 that NP7 has one premodifier of AJP3 523, and identifies that AJP3 523 is not a potentially reattachable node. The process then proceeds to analyze AJP3 523, and determines that AJP3 523 has no premodifiers at step 425. This process also determines that the head of the current node AJP3 523 is of a type "adjective" which is a potential host of attachment at step 430 and increments the unigram counts for the normalized head of AJP3 523 at step 435 as follows:

| | |
|---|---|
| ADJ_unigram | "DETP" |
| ADJ_unigram | "ADJ" |

At step 440 the process determines that there are no postmodifiers to AJP3 523 and returns to NP7 522. The system then identifies at 430 that the head of the node NP7 522 is of a type "noun" which is a potential host of attachment and increments at step 430 the unigram counts for the normalized head of NP7 522 as follows:

| | |
|---|---|
| NOUN_unigram | "galosh" |
| NOUN_unigram | "NOUN" |

The process then identifies at step 440 that NP7 522 does not have any postmodifiers and at step 465 returns to PP5 520. The system then analyzes PP5 520 again determining that there are no postmodifiers remaining for PP5 520, and the system recurses back up to NP8 518. The system then identifying no additional postmodifiers to the head of NP8 518, returns to PP5 504. The process continues the recursion back to DECL1 501 as there are no additional postmodifiers to be analyzed. The system identifies that DECL1 501 is the root node of the syntax tree 500, and thus terminates the process at step 470. Following the termination of the process, the process of FIG. 4 proceeds to obtain a new textual input from the training data and repeats the process illustrated above.

Following the completion of the training phase the associated n-gram counts for each particular n-gram that was unambiguously attested to in the output of the parser, and its associated counts, are stored as a data file in any known format that is usable during the runtime phase.

Figure 6A:
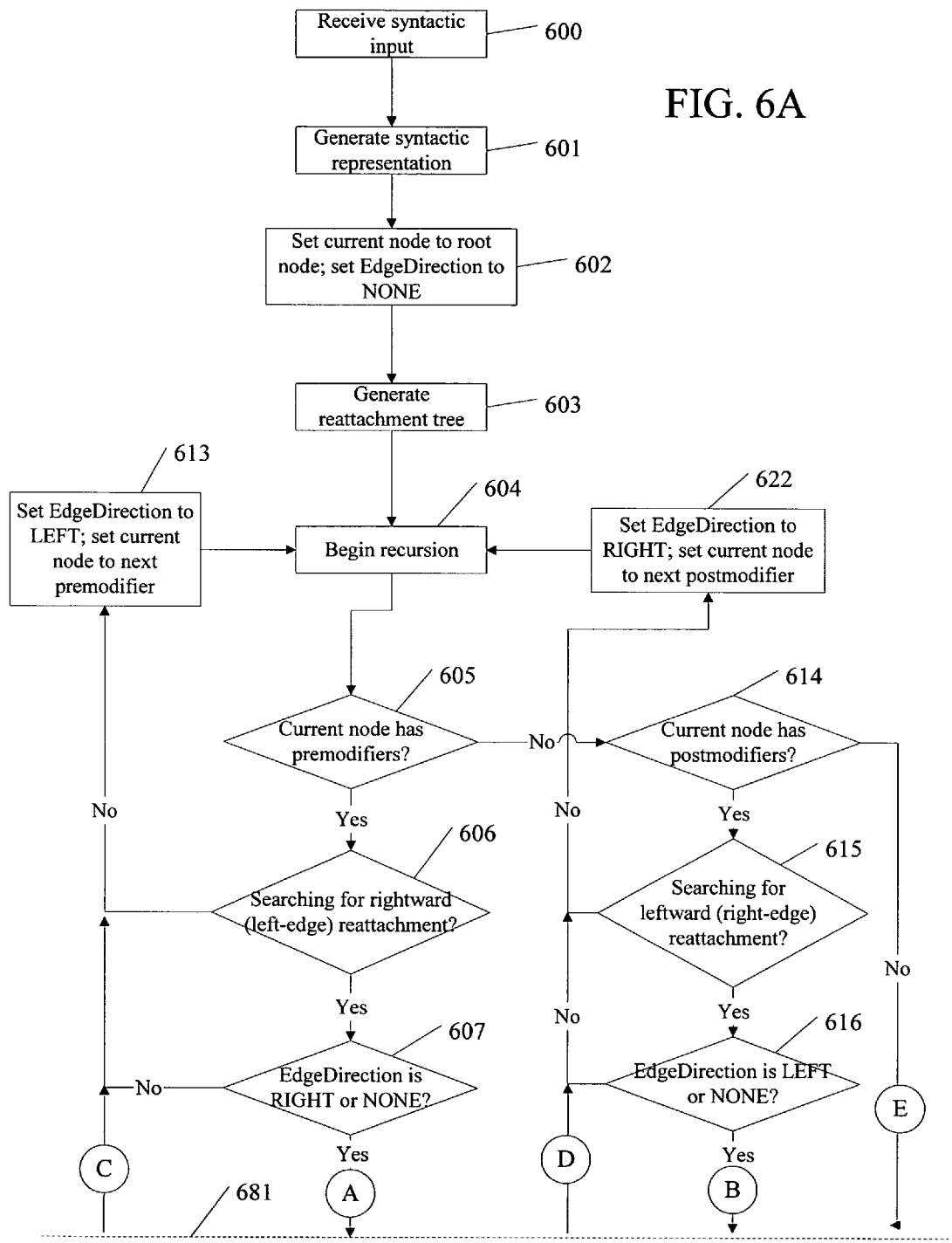
FIGS. 6A and 6B are a flow diagram illustrating the steps executed during the runtime phase.
Figure 6B:
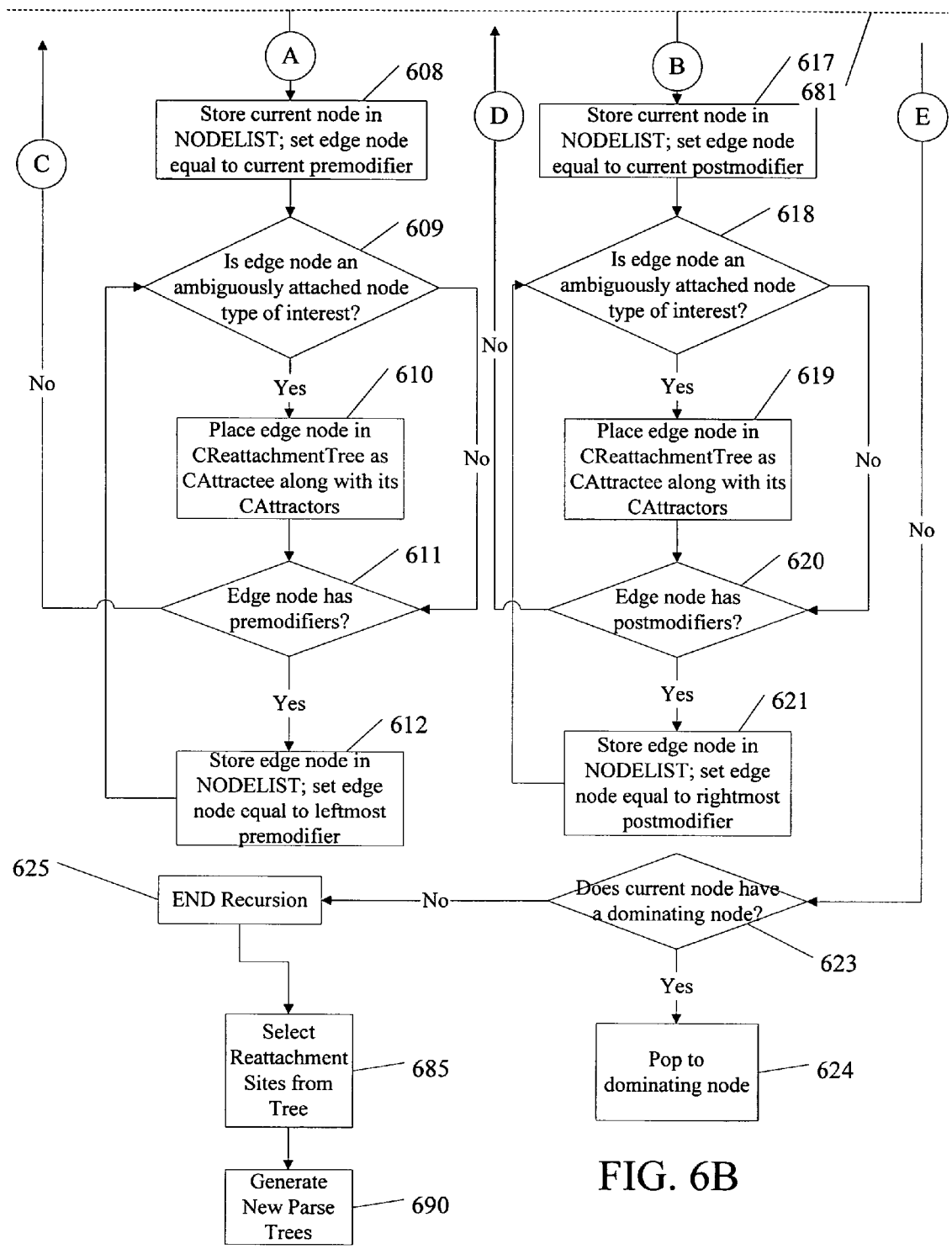

During the runtime phase of the present invention the data file containing the n-grams and associated frequencies generated during the training process described above in FIG. 4 is used during a syntactic parsing of a textual input in order to resolve instances of ambiguous attachment. These instances of ambiguous attachment arise when producing the syntactic representation, as certain phrases are deliberately left attached as low as possible in the syntactic representation by design. It is important to remember that in order to produce the best possible set of interpretations for some input, it is necessary to determine the best possible attachment positions for each ambiguously attached phrase. One exemplary process for determining the best possible attachment position of an ambiguously attached phrase is illustrated in the flow diagram of FIGS. 6A and 6B. FIGS. 6A & 6B are best understood when joined together along dashed line 681 that appears in both FIG. 6A and 6B. Lines of flow that extend between FIGS. 6A & 6B are further identified by transfer bubbles A, B, C, D & E which appear in both FIGS. 6A & 6B.

The process begins by receiving a syntactic or textual input at step 600. For purposes of this discussion, the following input was provided at step 600:

Susan sent the package to Paris without addressing it.

Figure 7:
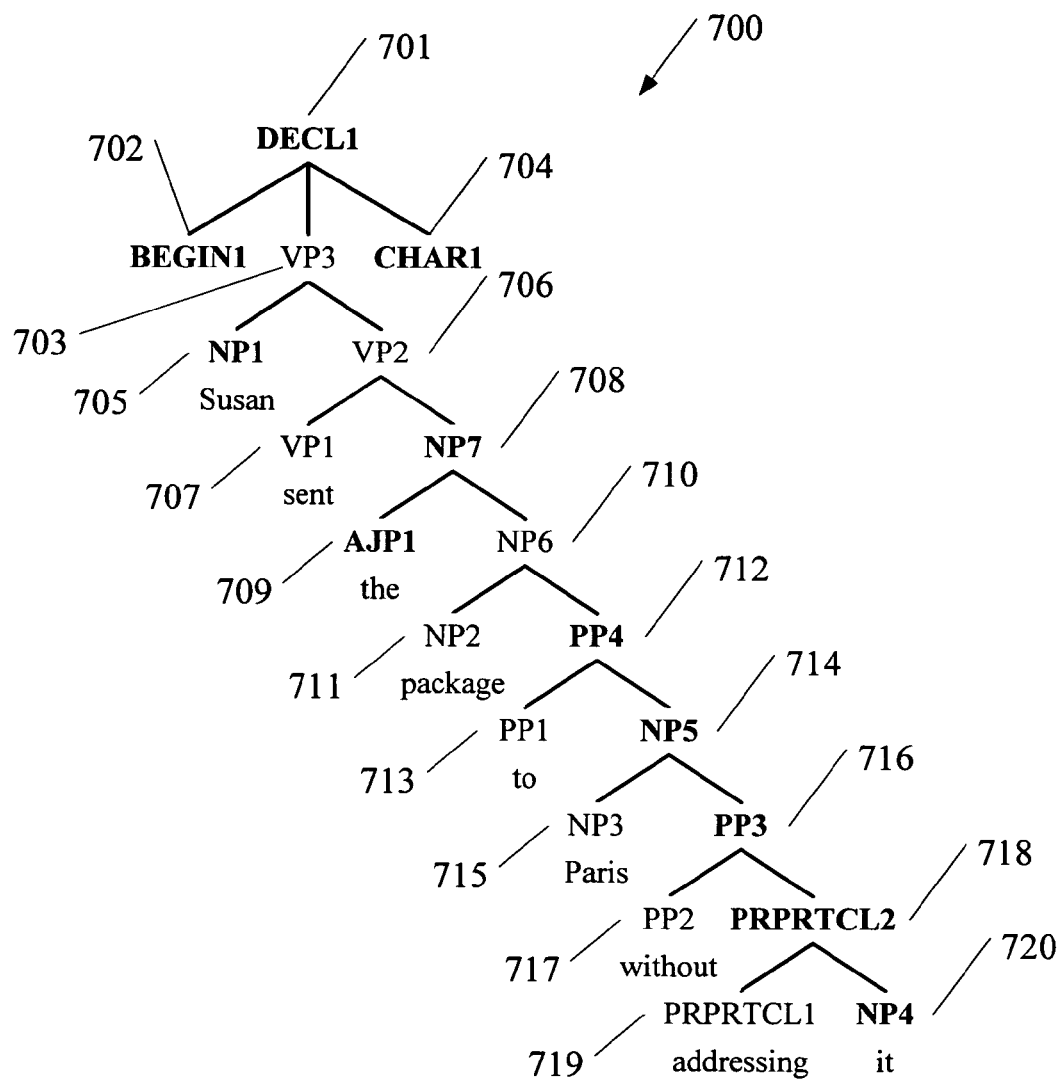
FIG. 7 is a syntactic representation of an exemplary input received during the runtime phase.

Following the receipt of the input at step 600 in FIG. 6, the runtime process of the present invention generates a syntactic representation of the input at step 601. One syntactic representation is illustrated in FIG. 7.

Now the runtime process is able to proceed to identify any ambiguously attached phrases. For purposes of simplifying the discussion it will be assumed that only prepositional phrases are eligible for reattachment. However, those skilled in the art will recognize that other phrases may in fact be reattached. Furthermore, it will also be assumed that reattachment will only take place in a leftward direction, so that only those phrases will be considered as candidates for reattachment which lie along the right edge of some maximal projection. Again, those skilled in the art will recognize that rightward reattachment could be implemented using the same mechanisms described here. The process used by the present invention to judge the relative likelihood of ambiguous attachments can be broken into four phases: 1) Identifying ambiguously attached phrases and noting any possible phrases to which they could attach; 2) For each ambiguously attached phrase calculating the likelihood of attachment to each identified potential attachment site; 3) Determining which potential attachment sites are worth further consideration; and 4) Performing the desired reattachment and producing a new set of syntactic representations, one for each potential syntactic representation in which the ambiguously attached phrase is attached to a potential reattachment site.

First the process sets the current node to the root node at step 602. Also, at this time, the variable EdgeDirection is set to hold the value NONE, indicating that the algorithm is not yet traversing an edge in either direction. Next, in order to find any ambiguously attached phrases in the syntactic representation the process constructs a CReattachmentTree data object to hold any information about potentially reattachable phrases and potential attachment sites. This is illustrated at step 603 of FIG. 6. In the example illustrated in FIG. 7 the root node is DECL1 701. Nodes illustrated in bold in FIG. 7 indicate that the particular node is a maximal projection node. In one embodiment of the present invention the process performs a depth-first left-to-right recursive analysis through the maximal projection nodes of the syntactic representation. However, other methods can be used. This recursive analysis through syntactic representation begins at step 604.

At step 605 the process proceeds to analyze the list of premodifiers to DECL1 701. The only identified premodifier for DECL1 701 is NP1 705. BEGIN1 702 is not considered to be a premodifier, as it is merely an abstract symbol used in parsing to demarcate the left edge of the input string. At step 606, if the current process were configured such that rightward (i.e., left-edge) reattachment were possible, the process would now attempt to construct an edge in the CReattachmentTree for the edge which leads leftward down the syntactic representation 700 from DECL1 701 through maximal projection node NP1 705. Since it is not the case that the process is considering rightward reattachment, instead at step 613 the process sets the variable EdgeDirection to LEFT, indicating that the current direction of tree traversal is leftward, i.e., from DECL1 701 to NP1 705. Also at step 613, the process advances to NP1 705 at step 612, setting the current node to this node of the syntactic representation and proceeding to step 604.

The process then analyzes the node NP1 705 and determines that there are no premodifiers or postmodifiers to NP1 705 at steps 605 and 614 respectively. Thus the process backs out of NP1 705 and into DECL1 701 at step 624, since there is no leftward or rightward edge contained by NP1 705. As the process has yet to analyze any potential postmodifiers to DECL1 701 the process sets the current node back to DECL1 701 and re-enters the process at step 613, with the value of the current node as DECL1 701.

Following the analysis of the left-hand side, the process of the present invention attempts to construct an edge in the CReattachmentTree for the edge which leads rightward down from DECL1 701 through maximal projection node NP7 708. The end result of this subprocess will be an identification of all maximal projection nodes that lie along this rightward edge which are ambiguously attached, along with a listing of the possible attachment sites for each ambiguously attached maximal projection node. Therefore, this subprocess will recurse down this right edge by identifying the rightmost postmodifier of each maximal projection node along the way, and if that maximal projection node is a potentially reattachable node type, the algorithm inspects the NODELIST, which is the list of previously visited (i.e., higher) nodes along this edge, to see if any of them is a potential host for attachment of this potentially reattachable node type. If any potentially reattachable maximal projection node has more than one potential host for attachment, then it will be considered to be ambiguously attached, and will be entered into the CReattachmentTree data structure, along with its potential hosts for attachment. Potentially reattachable maximal projection nodes are termed "CAttractees", and potential sites for attachment for some given CAttractee are termed "CAttractors".

With the value of the current node set to DECL1 701, at step 614 the process determines that DECL1 701 contains postmodifiers (namely NP7 708 and CHAR1 704), and determines at step 615 that it is indeed searching for cases of leftward reattachment. At step 616 the process confirms that the current value of EdgeDirection is NONE, so the process moves to step 617. It is important to note that steps 617 through 621 inclusive form a set of steps which will be performed for all postmodifiers of DECL1 701, or of any node which passes the tests of steps 614, 615, and 616. At step 617 DECL1 701 is stored into NODELIST, and the variable "edge node" is set to the current postmodifier of DECL1 701, namely NP7 708. At step 618, the process determines that NP7 708 is not a node type of interest for reattachment, not being of category PP, or prepositional phrase. Therefore the process jumps to step 620, and determines that NP7 708 does indeed have postmodifiers, namely a unique postmodifier, PP4 712. At step 621, the process stores the current edge node, or NP7 708, into NODELIST, and sets edge node to be the rightmost postmodifier of the current edge node; at this point the value of edge node will be PP4 712.

The process now jumps back to step 618, with the value of edge node being PP4 712. At step 618, the process considers whether PP4 712 is an ambiguously attached node type of interest. As a prepositional phrase is a potentially reattachable phrase type, the process proceeds to identify any nodes to which PP4 712 can be attached, using the nodes in NODELIST, which at this point holds {DECL1, NP7}. The process identifies that PP4 712 is potentially reattachable to a verb, which is the phrase type of the head of DECL1 701, and that PP4 is also attachable to a noun, which is the phrase type of the head of NP7 708. Thus, there are two nodes identified along the edge DECL1 to NP7 to which PP4 712 could be attached. 6.

Following this identification, PP4 712 is added into the CReattachmentTree 800 as a CAttractee 810 with NP7 and DECL1 as its potential CAttractors 811 and 812 respectively. The process now continues at step 620 by evaluating PP4 712 to see if it has any postmodifiers. As it has one postmodifier, NP5 714, the process continues to step 621, where it puts the current edge node, PP4 712, into NODELIST, and sets the edge node to be the rightmost postmodifier of PP4 712. This postmodifier is NP5 714. The process now jumps back to step 618, with the value of edge node being NP5 714. At step 618, the process considers whether NP5 714 is an ambiguously attached node type of interest. As a noun phrase is not a potentially reattachable phrase type, the process jumps to step 620, where it evaluates whether the current edge node, NP5

714, has any postmodifiers. NP5 714 has one postmodifier, PP3 716, so at step 621 NP5 714 is stored into NODELIST and edge node is now set to be the rightmost postmodifier of NP5 714, namely PP3 716. The process now jumps back to step 618, with the value of edge node being PP3 716. At step 618, the process considers whether PP3 716 is an ambiguously attached node type of interest. As a prepositional phrase is a potentially reattachable phrase type, the process proceeds to identify any nodes to which PP3 716 can be attached, using the nodes in NODELIST, which at this point holds {DECL1, NP7, PP4, NP5}. The process identifies that PP4 712 is potentially reattachable to a verb, which is the phrase type of the head of DECL1 701, and that PP4 is also attachable to a noun, which is the phrase type of the head of NP7 708 and of NP5 714. Thus, there are three nodes identified along the edge DECL1 to NP7 to which PP3 716 could be attached.

Following this identification, PP3 716 is added into the CReattachmentTree 800 as a CAttractee 820 with NP5, NP7 and DECL1 as its potential CAttractors 821, 822, and 823 respectively.

The process now continues at step 620 by evaluating PP3 716 to see if it has any postmodifiers. As it has one postmodifier, PRPRTCL2 718, the process continues to step 621, where it puts the current edge node, PP3 716, into NODELIST, and sets the edge node to be the rightmost postmodifier of PP3 716. This postmodifier is PRPRTCL2 718. The process now jumps back to step 618, with the value of the edge node being PRPRTCL2 718. At step 618, the process considers whether PRPRTCL2 718 is an ambiguously attached node type of interest. As a present participle phrase is not a potentially reattachable phrase type, the process jumps to step 620, where it evaluates whether the current edge node, PRPRTCL2 718, has any postmodifiers. PRPRTCL2 718 has one postmodifier, NP4 720, so at step 621 PRPRTCL2 718 is stored into NODELIST and the edge node is now set to be the rightmost postmodifier of PRPRTCL2 718, namely NP4 720. The process jumps to step 618.

At step 618, the process evaluates the current edge node, NP4 720, to see if it is an ambiguously attached node type of interest. As a noun phrase, it is not a phrase type of interest for reattachment, so the process jumps to step 620. Since NP4 720 has no postmodifiers, the process of scanning the rightward edge for ambiguously attached phrases terminates. Current node is still set to DECL1 701, so the process sets the value of the EdgeDirection variable to RIGHT and sets current node equal to the first postmodifier of the current node, namely NP7 708, and moves to step 604.

The process of the present invention proceeds to repeat the process described above with respect to DECL1 701 for each of the remaining maximal projection nodes in the syntactic representation. During this recursion, the process of the present invention attempts to set the edge direction to both right and left for each maximal projection node. (In the example under discussion, only rightward reattachment was considered, but in real language cases, there are genuine cases of left-edge reattachment that can be handled by the same general process as described here.) The process of the present invention attempts to construct a CReattachmentTree for each edge of each maximal projection node. During these recursions, the process is able to identify or detect that it has already traversed a specific edge from a maximal projection node, by using the value of the EdgeDirection variable. When the edge has already been traversed (i.e. from a higher node) by the process, any ambiguously attached phrases found are not analyzed further.

Following the completion and traversal of the syntactic representation, the process of the present invention has completed the CReattachmentTree 800 that corresponds to the syntactic representation 700 illustrated in FIG. 7. The nodes illustrated in bold 810 and 820 of the CReattachmentTree 800 of FIG. 8 indicate that these nodes in the syntactic representation 700 were identified as being ambiguously attached. Each node in the CReattachmentTree 800 is linked to two or more instances of a CAttractor data object that represent the nodes in the original syntactic representation which are potential attachment sites for the nodes represented by the CAttractee data objects 810 and 820. The generated CReattachmentTree 800 is used as the input for the phrase attachment module 205 that is used in calculating the overall and relative likelihood of attachment for the ambiguously attached phrases during steps 685 and 690 of FIG. 6.

Now that a CReattachmentTree 800 containing information about one or more of the identified ambiguously attached nodes in a syntactic representation has been created, the present invention proceeds to perform calculations needed to determine the relatively likelihood of attachment for any ambiguously attached node at step 685 in FIG. 6.

The present invention obtains numerical information about unambiguously attached syntactic nodes that was gathered during the training phase described above in FIG. 4. In one embodiment the present invention simply runs through all the CAttractor data objects in the CReattachmentTree 800, and for each CAttractor data object determines the likelihood of attachment of the node represented by that CAttractor to the syntactic tree node represented by the CAttractee data object with which that CAttractor is connected in the CReattachmentTree 800.

Again, it is worth noting that the current description uses a simple n-gram statistical model, with simple backoff smoothing, for calculating the relative likelihoods of attachment of some ambiguous phrase to the various possible attachment sites. However, it is not essential to the present invention that this type of statistical model be used; other statistical models can be used, such as a maximum entropy or conditional random field model, or any other kind of statistical modeling method. In these embodiments, all that would differ are the precise bits of information stored off in the training phase and consulted in the runtime phase.

For example, a first set of calculations through the CReattachmentTree 800 determines the likelihood of attachment of PP3 to NP5. Below is illustrated an exemplary trace code of the process of the present invention that indicates the calculations executed by the process.

* Attachment probability of "PLACE"-PP
(NOUN_PP_bigram):
   0.007479535   (14136/1889957)
* Bigram probability of "PLACE"-"without"
(NOUN_PP_bigram):
| | | |
|---|---|---|
| Bigram: | 0.000025927 | (49/1889957) |
| Unigram backoff: | 0.003628737 | (10158/2799321) |
| Total: | 0.000061955 | (0.99 * 0.000025927) + |
| | | (0.01 * 0.003628737) |

* Trigram probability of "PLACE"-"without"-"PRPRTCL"
(NOUN_PP_NP_trigram):
| | | |
|---|---|---|
| Trigram: | 0.163265306 | (8/49) |
| Bigram backoff: | 0.150817090 | (1532/10158) |
| Unigram backoff: | 0.028610409 | (83841/2930437) |
| Total: | 0.160798415 | (0.90 * 0.163265306) + |
| | | (0.09 * 0.150817090) + |
| | | (0.01 * 0.028610409) |

* Overall N-gram-based attachment probability of PP3 to NP5: (original attachment)
   0.000009962 (0.000061955 * 0.160798415)

One important number for the calculation of the likelihood of attachment of a prepositional phrase to a potential site of attachment, whether it is the original attachment site, or a proposed site of reattachment, is the trigram probability. In this example, the trigram probability is 8/49 or 0.163265306. This probability reflects the number of times that the training data has encountered examples of the trigram "PLACE"-"without"-"PRPRTCL" divided by the number of times that the training data has attested examples of the bigram "PLACE"-"without". In other words, this probability shows the likelihood of finding the sequence exemplified by the prepositional phrase PP3 when that prepositional phrase is attached to the noun phrase NP5.

It is often the case that a particular trigram and the sentence being analyzed is not attested to or encountered in the training data. To account for this potential a variety of so-called "backoff" counts are also stored during the training phase illustrated in FIG. 4 above. If there is not a method for backing up from a zero count, the process of the present invention would incorrectly produce a zero probability in certain cases. In these cases it may be more appropriate to estimate the true probability using less specific information than is contained in a trigram count. There is a plethora of backoff strategies discussed in the statistical natural language processing literature, and any one of these strategies can be used in the present invention.

Figure 8:
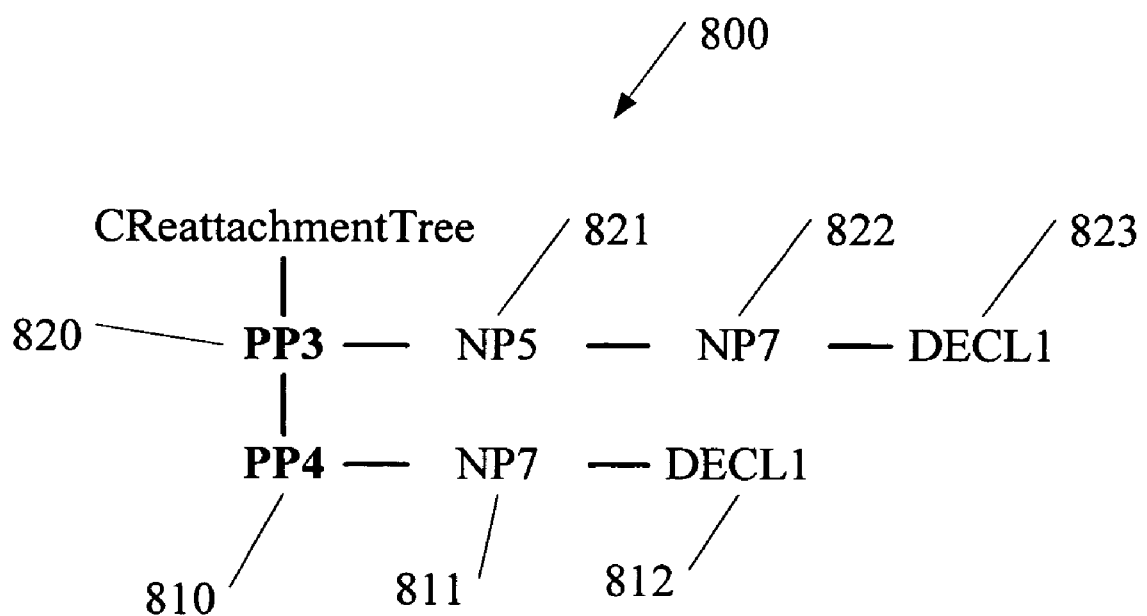
FIG. 8 is a diagrammatic representation of reattachment tree of the present invention.

For purposes of completeness, one illustrative embodiment of the calculation of the likelihood of attachment of PP3 in FIG. 8 to NP7 and DECL1 are provided below.

```
* Attachment probability of "package"-PP
(NOUN__PP__bigram):
    0.040537328    (341/8412)
* Bigram probability of "package"-"without"
(NOUN__PP__bigram):
    Bigram:            0.000118878   (1/8412)
    Unigram backoff:   0.003628737   (10158/2799321)
    Total:             0.000153976   (0.99 * 0.000118878) +
                                     (0.01 * 0.003628737)
* Trigram probability of "package"-"without"-
"PRPRTCL" (NOUN__PP__NP__trigram):
    Trigram:           0.000000000   (0/1)
    Bigram backoff:    0.150817090   (1532/10158)
    Unigram backoff:   0.028610409   (83841/2930437)
    Total:             0.013859643   (0.90 * 0.000000000) +
                                     (0.09 * 0.150817090) +
                                     (0.01 * 0.028610409)
* Overall N-gram-based attachment probability of PP3
to NP7: (proposed reattachment)
    0.000002134 (0.000153976 * 0.013859643)
```

In order to ensure that the process has generated useful probabilities, the probabilities of attachment of PP3 to the three potential attachment sites (NP5, NP7 and DECL1) must sum to 1.0. This normalization step is performed, in one embodiment by dividing each individual probability by the sum of all probabilities. However, other processes can be used in the present invention for normalization. For instance, in the current example, the sum of the individual probabilities of attachment of PP3 to NP5, NP7 and DECL1 is 0.000107513 (0.000009962+0.019849217+0.887490635). Using the sum as a normalizing factor allows the present invention to properly compare these three probabilities. The normalization step allows the process to compare the likelihood of attachment of each potential attachment site for PP3 as illustrated by the following exemplary section of trace code:

Normalized N-gram probabilities for PP3's attractors:
NP5: 0.092660148 (0.000009962/0.000107513)
NP7: 0.019849217 (0.000002134/0.000107513)
DECL1: 0.887490635(0.000095417/0.000107513)

Thus it is possible to ascertain that attaching PP3 to DECL1 represents the statistically most likely attachment site for PP3 as determined by information derived from unambiguous attachments in the training data.

Next the process determines which potential attachment sites are worth further consideration at step 690. As the present invention has determined the relative statistical likelihood associated with various pairings of ambiguously attached nodes as well as the potential of attachment sites for those nodes the process now proceeds to prune the CReattachmentTree data object. During this pruning the process removes all CAttractee data objects which represent attachments whose likelihood score is such that they are considered to represent unlikely interpretations of the input.

The present invention performs this step by using a threshold factor. In one embodiment, this threshold factor has a value that lies between 0.0 and 1.0. However, other threshold values can be used. This threshold represents a ratio that must hold between the statistical likelihood of the likeliest attachment and a potential reattachment node before the proposed reattachment will be performed. Equation 1 below illustrates this:

$$P_{proposed\ attachment} >= T * P_{likeliest\ reattachment}$$  Equation 1 where P is the probability of attachment and T is the threshold. If Equation 1 is true, then the reattachment will be carried out. Therefore, if the threshold is set to zero, a proposed reattachment will always be performed, since its probability is greater than or equal to zero. However, if the threshold is set to 1.0, then only those proposed reattachments having a probability that is equal to or greater than the probability of the likeliest attachment will be performed. However, other methods indicative of probability can be used to determine whether reattachment will be performed.

In the context of the current example, if the threshold is set to zero, the process will produce alternative syntax trees in which PP3 is attached to all possible attachment sites. If the threshold is set to 1.0 then the only tree that will be produced has PP3 attached to DECL1. In order for additional reattachment to occur, the threshold would have to be set to approximately 0.104 for a syntax tree to be produced in which PP3 is attached to NP5. This threshold allows a way to control the "exuberance" of the reattachment process by limiting the number of attachment trees generated. In certain contexts or under certain assumptions about the type of input, it may be appropriate to produce as many alternative syntax trees as possible. For example, it may be appropriate to assume that some later processing layer, which consumes syntax trees as its input, will contain specific information about ranking the likelihood of these syntax trees regardless of any generic statistical model. In other cases it may be appropriate to constrain the process responsible for producing a set of syntax trees such that only those trees are produced which correspond to extremely likely interpretations. The final step of the process of the present invention is to perform reattachments that were selected in step 690 thus producing new syntax trees when the process is executed at step 695.

In one embodiment, during reattachment a new tree is built by passing the initial tree, the identity of the target node and the identity of the reattachment node to a tree reconstruction module 318, which builds a new parse tree 320 by reattaching the reattachment node to the target node. The process of building the new tree involves applying well known reattachment rules to construct the tree. These rules are illustratively drawn from the same set of rules as are used to construct the initial parse tree 700. Note that the reattachment node can be attached to a node that shares the same head as the target node instead of the target node itself if a rule provides for such a reattachment. Further, the reattachment module 318 is able to estimate the overall likelihood of the new tree. Each tree is ranked with respect to its overall likelihood of representing a valid interpretation of the input. This is illustratively done via a distinct statistical mechanism known as a Statistical Goodness Metric (SGM). For any node which is reattached, the statistical algorithm is in possession of the measure indicative of the probability that is more or less statistically likely than the original attachment. This factor is determined by dividing the likelihood of the reattachment by the likelihood of the original attachment. For instance, in the current example, PP3 is reattached from its original attachment site (NP5) up to DECL1. The factor by which this new attachment is statistically more likely than the original attachment is ~9.578 (the value obtained by dividing 0.887490635 by 0.092660148). Therefore, the overall SGM score of the syntax tree created via this reattachment operation will be equal to the SGM score of the original Sketch tree multiplied by ~9.578.

It can thus be seen that the present invention parses input text and analyzes attachment phenomena in a way that is highly advantageous over prior systems. Embodiments of the invention include training or deployment or both.

Although the present invention has been described with reference to particular embodiments, workers skilled in the art will recognize that changes may be made in form and detail without departing from the spirit and scope of the invention.

What is claimed is:

1. A method for identifying a location in a syntactic representation of a text fragment for an ambiguously attached phrase, the method comprising the steps of:
    identifying at least one potential attachment node in the syntactic representation for the ambiguously attached phrase by, for each given potential attachment node, accessing a statistical attachment model to generate a score that indicates whether attachment of the ambiguously attached phrase to the given potential attachment node results in a new syntactic representation that represents a likely interpretation of the text fragment;
    selecting a number of the at least one potential attachment nodes to attach the ambiguous phrase;
    generating a new syntactic representation for each of the selected potential attachment nodes; and
    outputting one or more of the new syntactic representations to a natural language processing component for natural language processing.

2. The method of claim 1 and further comprising, prior to identifying the potential attachment node:
    generating the syntactic representation for the text fragment; and
    identifying any ambiguously attached phrases in the syntactic representation.

3. The method of claim 1 further comprising:
    accessing the statistical attachment model to generate an overall score for each new syntactic representation; and
    ranking each new syntactic representation relative to other new syntactic representations based on the score generated by the statistical attachment model that is indicative of overall likelihood of attachment.

4. The method of claim 1 wherein identifying ambiguously attached phrases includes:
    analyzing the syntactic representation of the text fragment.

5. The method of claim 4 wherein the syntactic representation comprises a parse tree that includes a plurality of projection nodes and wherein identifying at least one potential attachment node comprises:
    performing a depth-first, left-to-right recursive analysis through the plurality of projection nodes; and
    analyzing each projection node for potential reattachment of the ambiguously attached phrase.

6. The method of claim 5 wherein analyzing each projection node includes:
    determining whether a selected node is reattachable to another projection node;
    determining whether the selected node is dominated by at least one other projection node to which the selected node can be reattached; and
    wherein if the selected node is reattachable to another projection node and is dominated by at least one other projection node, identifying each of the at least one other projection node to which the selected node can be reattached.

7. The method of claim 1 wherein selecting a number of potential attachment nodes comprises:
    determining whether the score generated from the statistical attachment model, associated with a given new statistical representation, meets a predetermined threshold value.

8. The method of claim 7 wherein selecting a number of potential attachment nodes further comprises:
    if the measure associated with the given new statistical representation meets the threshold value, selecting the potential attachment node used in the given new syntactic representation.

* * * * *